United States Patent
Nagle et al.

(10) Patent No.: US 12,285,041 B2
(45) Date of Patent: Apr. 29, 2025

(54) ULTRASONIC ROTARY MOLDING

(71) Applicant: Mars, Incorporated, McLean, VA (US)

(72) Inventors: Robert Nagle, Hackettstown, NJ (US);
Alfred Camporini, Hackettstown, NJ (US); David Pontzer, Hackettstown, NJ (US); Paul Capar, Hackettstown, NJ (US); David Fyock, Lititz, PA (US); John Stough, Lititz, PA (US); Curt Knepper, Lititz, PA (US); Joseph Edward Massie, Danbury, CT (US); Jeffrey Frantz, Danbury, CT (US); Carlos Aponte, Danbury, CT (US); Gary Lee McQuilkin, Plymouth, MN (US)

(73) Assignee: Mars, Incorporated, Chicago, IL (US)

( * ) Notice: Subject to any disclaimer, the term of this patent is extended or adjusted under 35 U.S.C. 154(b) by 652 days.

(21) Appl. No.: 15/692,867

(22) Filed: Aug. 31, 2017

(65) Prior Publication Data
US 2017/0360077 A1 Dec. 21, 2017

Related U.S. Application Data

(63) Continuation of application No. 14/388,135, filed as application No. PCT/US2013/032148 on Mar. 15, 2013, now Pat. No. 10,010,107.
(Continued)

(51) Int. Cl.
*A23P 30/10* (2016.01)
*A21C 11/04* (2006.01)
(Continued)

(52) U.S. Cl.
CPC ............ *A23P 30/10* (2016.08); *A21C 11/04* (2013.01); *A21C 11/10* (2013.01); *A21C 11/12* (2013.01);
(Continued)

(58) Field of Classification Search
CPC ........................................................ A23P 1/05
(Continued)

(56) References Cited

U.S. PATENT DOCUMENTS

| 140,824 A | 7/1873 | Hall et al. |
| 641,725 A | 1/1900 | Peters |

(Continued)

FOREIGN PATENT DOCUMENTS

| CN | 1611332 | 5/2005 | | |
| FR | 2230294 | * 1/1975 | ............... | A22C 7/00 |

(Continued)

OTHER PUBLICATIONS

English translation of FR 223094, accessed at https://worldwide.espacenet.com/patent/search/family/009120051/publication/FR2230294A1?q=pn%3DFR2230294A1; 1974.*

(Continued)

*Primary Examiner* — Nikki H. Dees
*Assistant Examiner* — Philip A Dubois
(74) *Attorney, Agent, or Firm* — Fish & Richardson P.C.

(57) ABSTRACT

The present disclosure describes an ultrasonic rotary molding system that is used to form edible compositions or food products as they move along a conveyor belt. The food products are formed by an ultrasonic rotary wheel that includes one or more cutting tools that cut, and perhaps three dimensionally mold, food product strips. The system may include a movable backing plate that is located below the point where the ultrasonic rotary wheel cuts the food product strips. The movable backing plate may be spring loaded and it may exert force upwards against the conveyor belt and in turn against the food product.

17 Claims, 11 Drawing Sheets

Related U.S. Application Data

(60) Provisional application No. 61/752,710, filed on Jan. 15, 2013, provisional application No. 61/709,228, filed on Oct. 3, 2012, provisional application No. 61/615,583, filed on Mar. 26, 2012.

(51) Int. Cl.

| | |
|---|---|
| *A21C 11/10* | (2006.01) |
| *A21C 11/12* | (2006.01) |
| *A21C 15/04* | (2006.01) |
| *A22C 7/00* | (2006.01) |
| *A22C 17/00* | (2006.01) |
| *A23G 3/02* | (2006.01) |
| *A23G 3/34* | (2006.01) |
| *A23P 10/00* | (2016.01) |
| *A23P 10/20* | (2016.01) |
| *A23P 20/00* | (2016.01) |
| *B26D 7/06* | (2006.01) |
| *B26D 7/08* | (2006.01) |
| *B26D 7/18* | (2006.01) |
| *B26F 1/38* | (2006.01) |
| *B29C 69/00* | (2006.01) |
| *B29L 31/00* | (2006.01) |

(52) U.S. Cl.
CPC .............. *A21C 15/04* (2013.01); *A22C 7/00* (2013.01); *A22C 7/003* (2013.01); *A22C 17/0006* (2013.01); *A23G 3/0025* (2013.01); *A23G 3/0252* (2013.01); *A23P 10/00* (2016.08); *A23P 10/20* (2016.08); *A23P 20/00* (2016.08); *B26D 7/0625* (2013.01); *B26D 7/086* (2013.01); *B26D 7/1854* (2013.01); *B26F 1/384* (2013.01); *B29C 69/001* (2013.01); *B29L 2031/752* (2013.01)

(58) Field of Classification Search
USPC ........................................................ 426/302
See application file for complete search history.

(56) References Cited

U.S. PATENT DOCUMENTS

| | | | |
|---|---|---|---|
| 2,966,085 A | 12/1960 | Hanson | |
| 3,312,134 A | 4/1967 | Roney et al. | |
| 3,456,776 A * | 7/1969 | Viene | B65G 23/44 |
| | | | 198/813 |
| 3,518,725 A | 7/1970 | Donofrio | |
| 4,369,200 A | 1/1983 | Iwao et al. | |
| 4,421,773 A | 12/1983 | Akutagawa | |
| 4,623,420 A | 11/1986 | Hinkley | |
| 4,708,296 A | 11/1987 | Powers | |
| 4,708,926 A * | 11/1987 | Kirchmayr | C08K 5/42 |
| | | | 427/145 |
| 4,711,693 A | 12/1987 | Holze | |
| 5,037,350 A | 8/1991 | Richardson et al. | |
| 5,382,149 A | 1/1995 | Yates et al. | |
| 5,388,489 A | 2/1995 | Dayley | |
| 5,861,185 A * | 1/1999 | Capodieci | A21C 11/08 |
| | | | 426/238 |
| 5,871,783 A | 2/1999 | Capodieci et al. | |
| 5,934,043 A | 8/1999 | Aindow et al. | |
| 6,058,823 A * | 5/2000 | Michoud | B06B 3/00 |
| | | | 83/508.3 |
| 6,261,620 B1 | 7/2001 | Leadbeater | |
| 6,309,490 B1 | 10/2001 | Davis et al. | |
| 6,325,952 B1 | 12/2001 | Jarrett | |
| 6,418,823 B1 | 7/2002 | Taitler | |
| 6,481,318 B1 | 11/2002 | Kinigakis et al. | |
| 6,607,765 B2 | 8/2003 | Capodieci | |
| 6,635,292 B2 | 10/2003 | Capodieci | |
| 6,759,079 B2 | 7/2004 | Klug et al. | |
| 7,067,167 B2 | 6/2006 | Damsgard et al. | |
| 7,316,556 B2 * | 1/2008 | Maniak | A21C 11/10 |
| | | | 425/306 |
| 8,011,278 B1 | 9/2011 | Loper | |
| 2003/0082283 A1 | 5/2003 | Capodieci | |
| 2005/0081692 A1 | 4/2005 | Mosiewicz | |
| 2005/0132579 A1 | 6/2005 | Sartori et al. | |
| 2006/0188622 A1 | 8/2006 | Suttle et al. | |
| 2007/0178205 A1 | 8/2007 | Kirksey | |
| 2008/0135556 A1 | 6/2008 | Bontrager | |
| 2008/0138472 A1 | 6/2008 | Alexandre | |
| 2008/0293461 A1 * | 11/2008 | Benes | A01F 12/40 |
| | | | 460/112 |
| 2010/0313720 A1 | 12/2010 | Grabau | |
| 2011/0132729 A1 | 6/2011 | Chisholm | |
| 2012/0058213 A1 * | 3/2012 | Lindee | B29C 37/0003 |
| | | | 425/135 |
| 2015/0044338 A1 | 2/2015 | Nagle et al. | |
| 2016/0007628 A1 | 1/2016 | Capar | |

FOREIGN PATENT DOCUMENTS

| | | |
|---|---|---|
| JP | 2000343611 | 12/2000 |
| RU | 2230655 C2 | 6/2004 |
| RU | 2009126585 | 4/2011 |
| SU | 1328197 | 8/1987 |
| TW | I273014 | 5/2007 |
| WO | 2009151508 | 12/2009 |
| WO | 2011130024 | 10/2011 |
| WO | WO 2011013002 | 10/2011 |
| WO | 2013148322 A1 | 10/2013 |

OTHER PUBLICATIONS

Veikle et al, Modeling the Power Requirements of a Rotary Feeding and Cutting System, Department of Chemical and Biological Engineering University of Saskatchewan, 2011, accessed at http://core.ac.uk/download/pdf/226114967.pdf.*
PCT International Preliminary Report on Patentability in International Application No. PCT/US2013/032148, dated May 15, 2014, 28 pages.
EP Search Report, Application No. 15153230.6, Jun. 5, 2015, 7 pgs.
ISA/EP, Notification of Transmittal of the International Search Report and Written Opinion of the International Searching Authority, or the Declaration, PCT/US2013/032148, Jul. 11, 2013, 9 pgs.
Vaitekunas, et al., "Effects of Frequency on the Cutting Ability of an Ultrasonic Surgical Instrument", Submitted to the 31st Annual Ultrasonic Industry Association Symposium, Oct. 11 and 12, 2001, Atlanta, GA., 10 pgs.

* cited by examiner

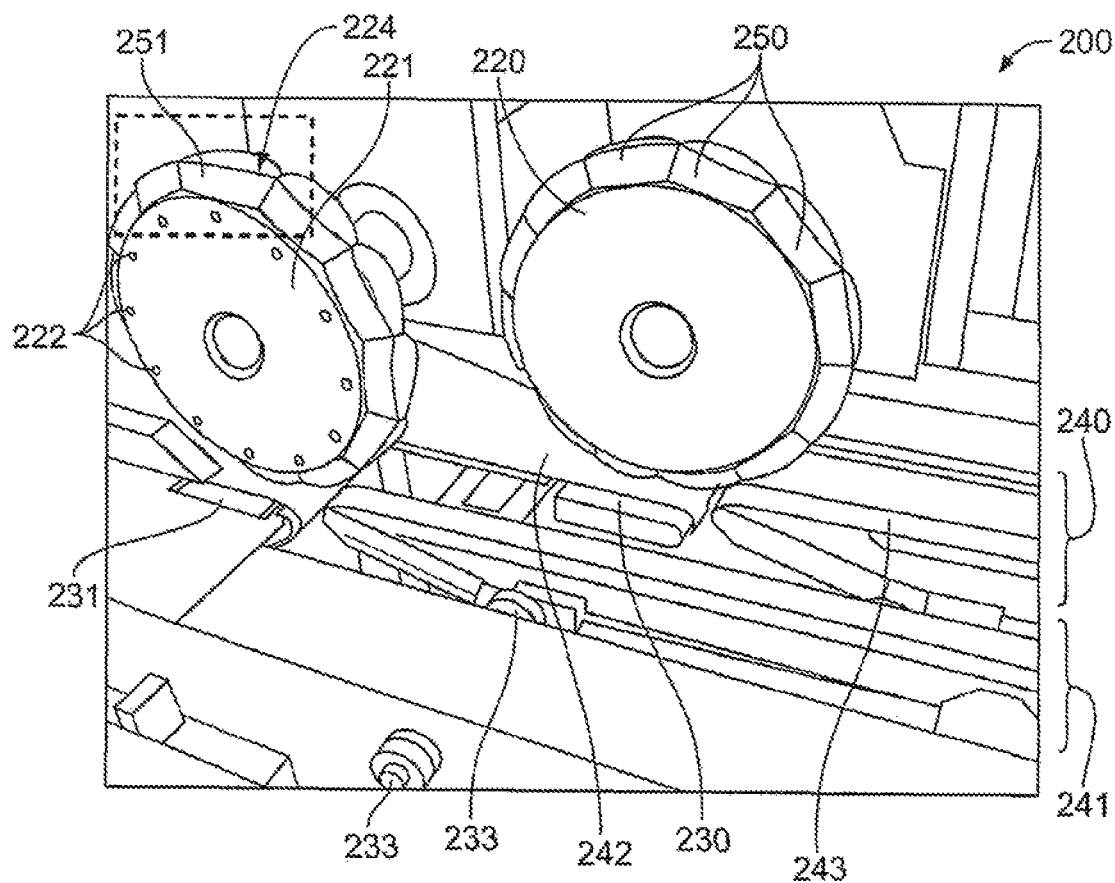
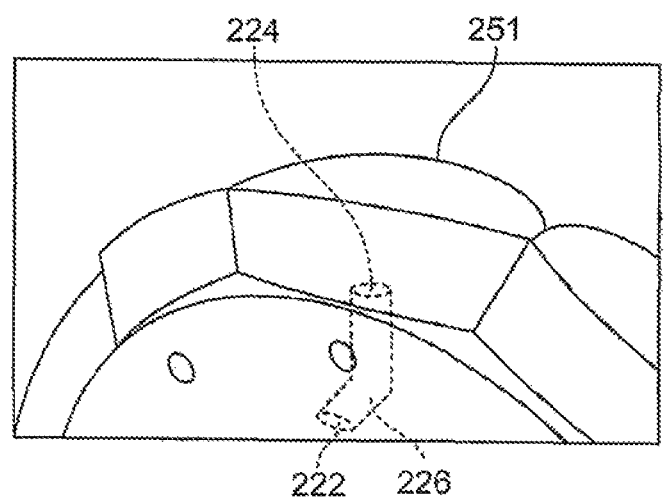
FIG. 3

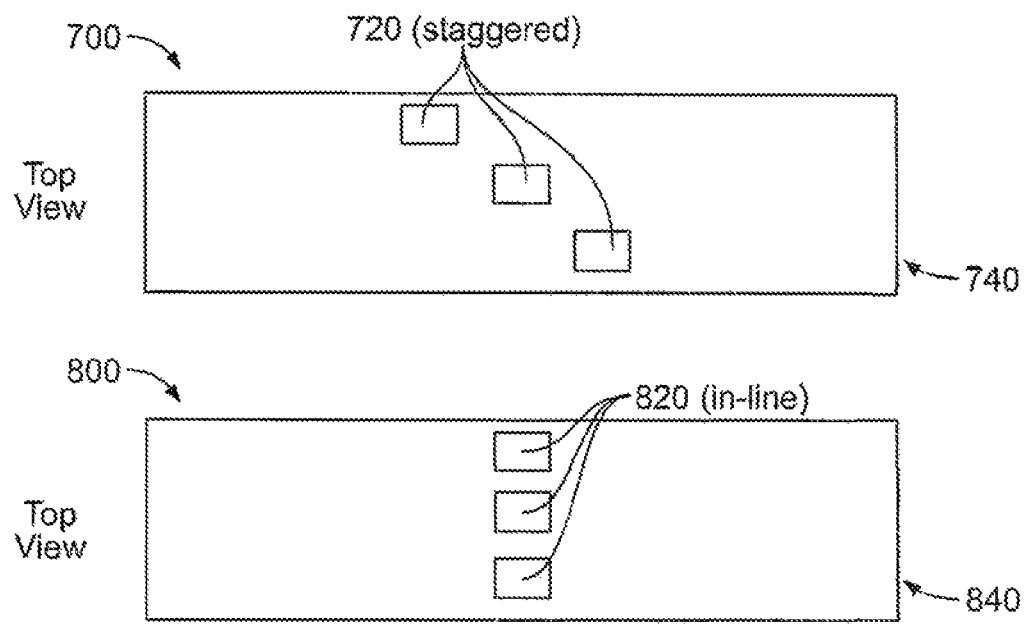
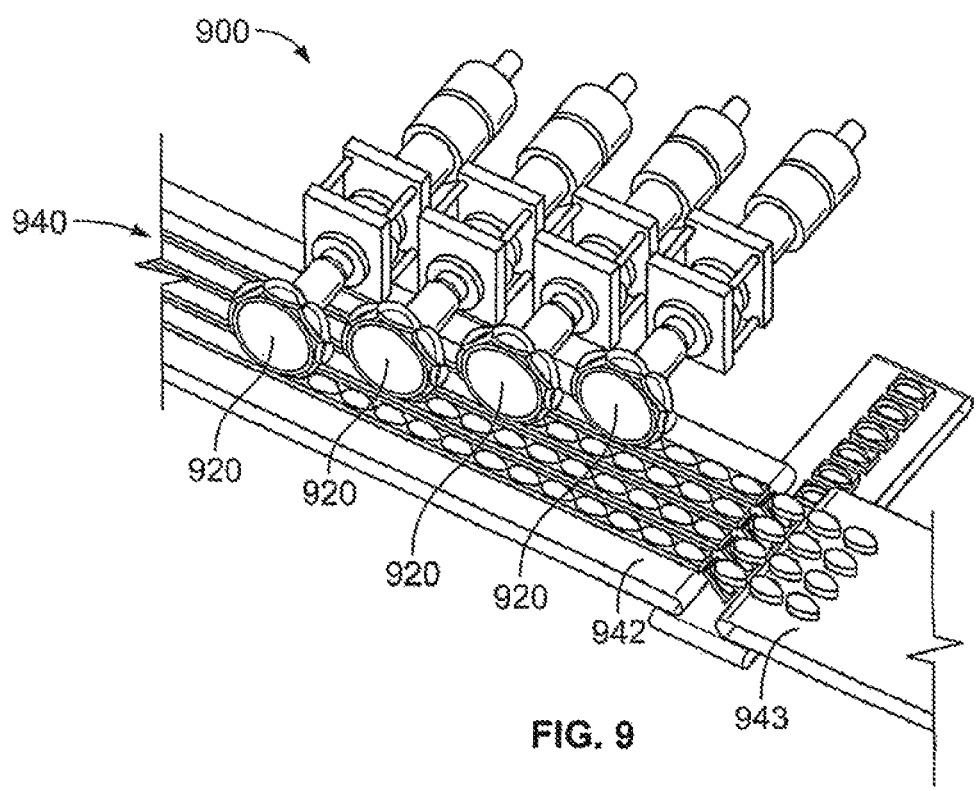
FIG. 8
FIG. 9

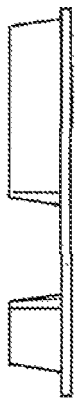
FIG. 14
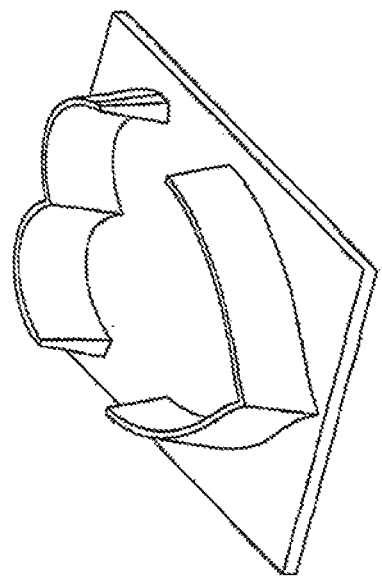
FIG. 16
FIG. 13
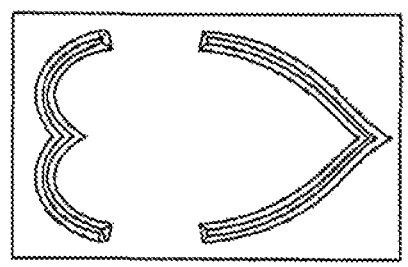
FIG. 15

FIG. 17
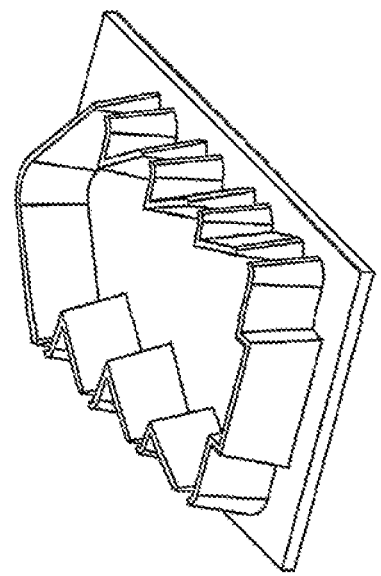
FIG. 18
FIG. 20
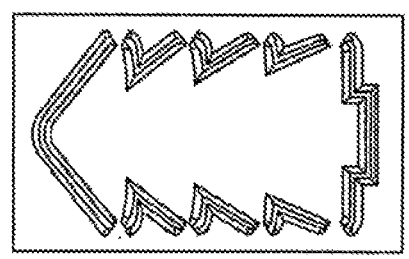
FIG. 19

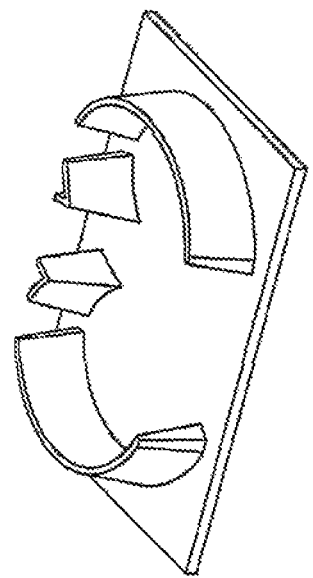

ULTRASONIC ROTARY MOLDING

CROSS REFERENCE TO RELATED APPLICATIONS

This application is a Continuation of U.S. patent application Ser. No. 14/388,135, filed on Sep. 25, 2014, which, in turn, is a U.S. § 371 Patent Application of International Application No. PCT/US2013/032148, filed on Mar. 15, 2013, which claims the benefit of U.S. Provisional Application No. 61/615,583, filed Mar. 26, 2012; U.S. Provisional Application No. 61/709,228, filed Oct. 3, 2012; and U.S. Provisional Application No. 61/752,710, filed Jan. 15, 2013; each of which is hereby incorporated by reference in their entirety.

FIELD

One or more embodiments of the present disclosure relate generally to the manufacturing of food products and more particularly to the ultrasonic rotary molding of edible compositions.

BACKGROUND

Millions of pounds of food products such as snack foods, cereals, and pet foods, for example, are purchased and consumed every year. Typically, many of these types of food products are manufactured and sold in the form of small, bite-sized shapes. For example, many popular snack foods and dry cereals today are packaged and sold in small, bite-sized shapes. Such bite-sized shapes may provide for convenient manufacturing and packaging of the food product as well as being easily consumable by consumers. Additionally, dry pet foods, such as dog food, for example, are also typically sold in small, bite-sized form. Small pet foods may also provide convenient manufacturing and packaging of the pet food products as well as being easily consumable by pets.

One method of manufacturing small, bite-sized food products is a guillotine-style cutter. In these systems, the guillotine cutter is located at a point along a conveyor belt and a cutter blade slices through strips of food product. Because the blade(s) of the guillotine cutter are generally straight, the guillotine cutter can only cut food products into final shapes that have linear and angular edges. Most often, the guillotine cutter is only adapted to cutting square and rectangular-shaped food products. With earlier styles of guillotine cutters, the food product tended to stick to the cutter blade. Some guillotine-style systems addressed this by using an ultrasonic cutter such as an ultrasonic knife or guillotine blade.

Another method of manufacturing these small, bite-sized food products is rotary forming. Traditionally, rotary forming of food products has typically been accomplished by using a pair of rotary forming wheels (the double-wheel style). Each of the rotary forming wheels typically includes a number of cavities positioned around the outer surface of each of the rotary forming wheels. Each cavity on one rotary forming wheel typically has a counterpart of the same shape and size on the other rotary forming wheel in the pair. The rotary forming wheels are typically positioned directly adjacent to each other with the outer surfaces of each of the rotary wheels facing each other. The rotary forming wheels are also typically positioned so that the outer surfaces of each of the rotary forming wheels are in close proximity to, or touching the other rotary forming wheel.

In operation, the rotary forming wheels typically are rotated in a downward fashion so that the cavities at the top of each of the rotary forming wheels are rotated towards each other. The timing of each of the rotary forming wheels is arranged so that the cavities along the outer edges of each of the rotary forming wheels align with each other at the point where the outer edges of the two rotary forming wheels are positioned closest together or touching. When the cavities of each of the rotary forming wheels align, a hollow mold is formed by the two cavities at the point where the outer surfaces of the two rotary forming wheels are positioned closest together or touching. Food product is introduced into the system by filling the upper most cavity of each rotary forming wheel. Then, rotation of the rotary forming wheels causes the filled cavities to become positioned adjacent to each other forming an enclosed mold as described above. As the rotary forming wheels continue to rotate downward, the cavities of each rotary forming wheel containing the formed food product begin to separate.

The food product supply system typically delivers the food product in a sticky or semi-adhesive state. Typically, the sticky or semi-adhesive properties of the food product cause the food product to stick to the inside of the cavities, which causes the molded food product to resist falling out of the cavity by the force of gravity alone when the wheels separate. Because of this issue, manufacturers have relied on a phenomena called "webbing" to facilitate the food product in removing from the cavity. Webbing occurs because excess food product leaks or squeezes out of the cavities when the rotary wheels are pressing the food product between corresponding cavities. The leaked food product created by one molding cavity adheres or sticks to the leaked food product created by the subsequent molding cavity, and so on. Thus, each formed food product is connected to the next formed food product through a "web" of food product. As previous formed food products are removed from the cavities and move along a conveyor line, the webbed food product pulls subsequent formed food products out of their cavities. However, the food product web serves little purpose beyond facilitating removal of molded food products from cavities, and the web results in wasted food product material, which adds to overall cost of the process.

A rotary forming apparatus that does not utilize a food product web is described in U.S. Pat. No. 6,635,292, entitled "Ultrasonic Rotary Forming of Food Products", by Roberto A. Capodieci, issued Oct. 21, 2003, which explains a similar two-wheel apparatus that uses an ultrasonically activated rotary wheel that facilitates a food product to detach from its cavity without the use of the food product web.

BRIEF DESCRIPTION OF THE DRAWINGS

Several features and advantages are described in the following disclosure, in which several embodiments are explained, using the following drawings as examples.

FIG. 3 is an illustration of an example system for forming edible compositions, according to one or more embodiments of the present disclosure.

FIG. 8 shows two top-plan-view illustrations of an example system for forming edible compositions, according to one or more embodiments of the present disclosure.

FIG. 9 is an angled-top-view illustration of an example system for forming edible compositions, including four rotary wheels, according to one or more embodiments of the present disclosure.

FIGS. 13-16 illustrate various views of a heart-shaped tool also having a first portion, a second portion, and a vented region.

FIGS. 17-20 illustrate various views of a Christmas-tree-shaped tool having several portions and several vented regions.

FIGS. 21-24 illustrate various views of a pumpkin shaped tool having several portions and several vented regions.

DETAILED DESCRIPTION

The present disclosure describes an ultrasonic rotary molding system that is used to form edible compositions or food products by forming the food product on a conveyor belt which is backed, at least in part, by a spring loaded platform. The resulting food products are typically bite-sized (such as pet treats, candy bar "eggs," nuggets, balls and the like), although the present disclosure contemplates using the solutions described herein to create larger food products as well (such as regular-sized pet treats such as dog bones, regular-sized candy bars, etc.). Throughout this disclosure, it should be understood that a reference to a particular resulting food product does not restrict the description to systems, equipment or solutions that create only that type of food product. For example, a description of a machine or a process that refers to a dog bone or candy bar, may also apply to the creation of an egg, and vice versa.

Figure 1:
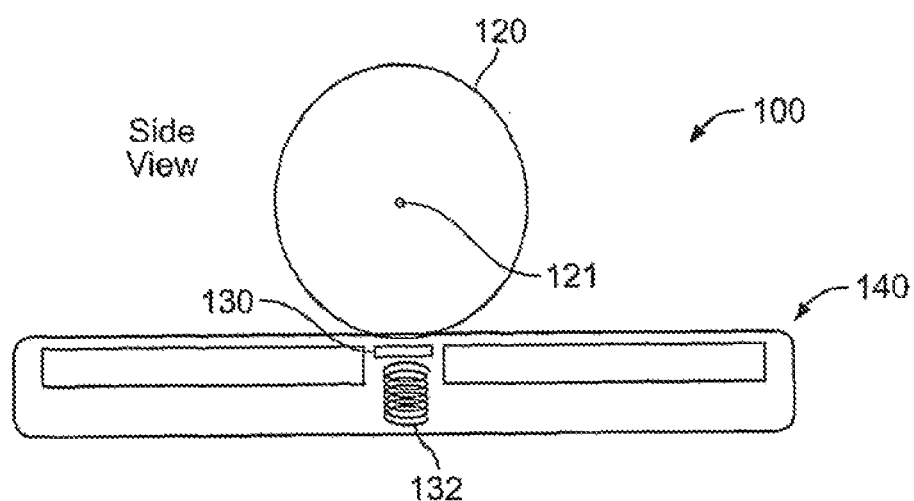
FIG. 1 is an illustration of an example system for forming edible compositions, according to one or more embodiments of the present disclosure.

FIG. 1 shows an illustration of an example system 100 for forming an edible composition, according to some embodiments of the present disclosure. The system comprises an ultrasonically activated rotary wheel 120, a moveable backing plate 130 and a conveying element 140. FIG. 3 shows another illustration of an example system 200 for forming an edible composition according to some embodiments of the present disclosure. As shown in FIG. 3, the system may include more than one rotary wheel (220 and 221), more than one moveable backing plate (230 and 231) and more than one conveying element (240 and 241).

FIG. 3 also shows two embodiments of the ultrasonic rotary wheel 220 and 221. In one embodiment of the rotary wheel, the rotary wheel 220 includes a plurality of tools, generally referenced with a number 250, for cutting strips of food product into a final size (or an intermediate size). Cutting tools may take many different shapes, sizes and depths, and may include different inner cavity shapes. FIG. 3 shows an example tool 250 that may be included as part of an ultrasonic rotary wheel according to one embodiment of the present disclosure. In this example, each tool 250 has an oblong cylindrical shape, where the rim of each tool has a shape that is similar to the cross-sectional shape of an egg. In some embodiments, the conveying elements can be narrower than the widest width of the cutting tools thereby allowing for any excess trim material to fall away from the finished shape.

Figure 4:
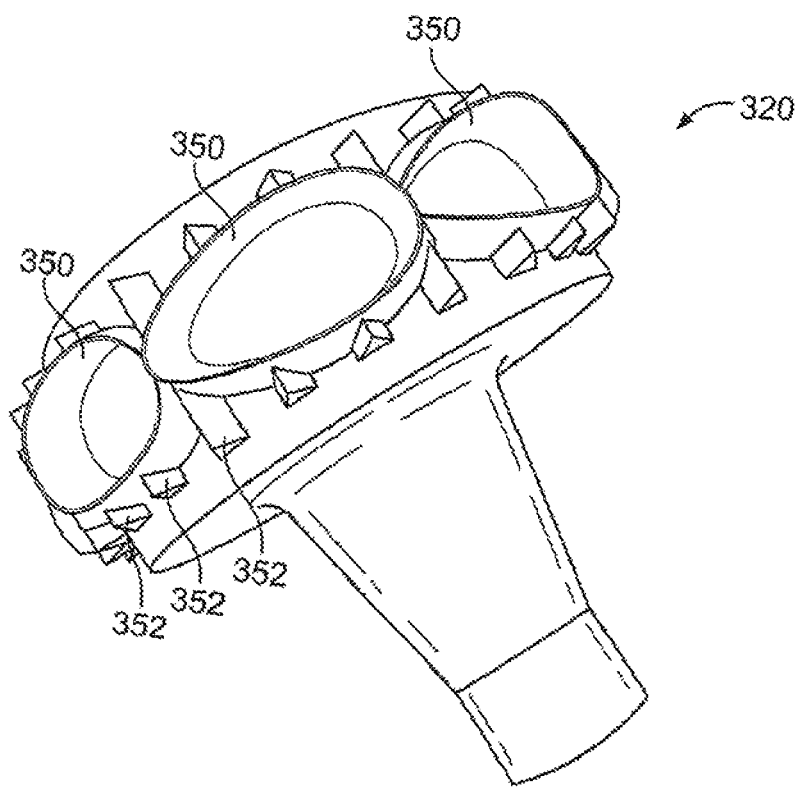
FIG. 4 is an illustration of an example ultrasonic rotary wheel, according to one or more embodiments of the present disclosure.
Figure 5:
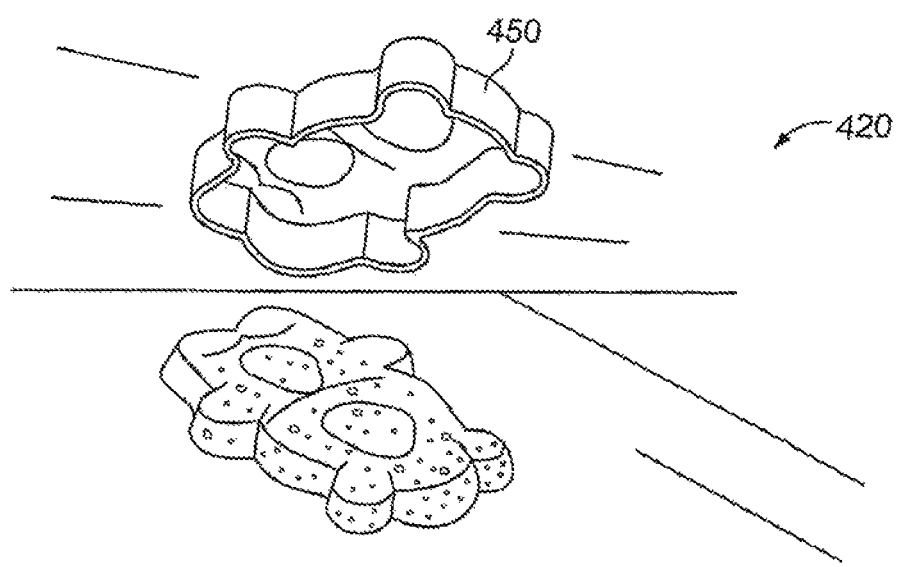
FIG. 5 is an illustration of an example tool that may be included as part of an ultrasonic rotary wheel, according to one or more embodiments of the present disclosure.

FIG. 4 shows another embodiment of the ultrasonic rotary wheel 320 and another example style of tool 350 that includes cutting fins 352 that are disposed adjacent to the cutting tool cylinders. In some embodiments, these cutting fins 352 may improve the forming of food products, but in other embodiments, the food product forming may work better without fins. FIG. 5 shows another embodiment of the ultrasonic rotary wheel 420 and another example tool 450 that may be included as part of an ultrasonic rotary wheel according to one embodiment of the present disclosure. As FIG. 5 shows, a cutting tool may have a more complex shape than simply a circle or an egg shape. In some embodiments, the tool 450 may be shaped such that the resulting formed food product resembles an animal or other recognizable shape.

Regardless of the shape, each cutting tool may include one or more edges that are adapted for cutting through a food product. The edges may be located at the outermost point or extremity of the cutting tool's side walls. In some examples, the edges are adapted for cutting through meat chunks, cereal grains, peanuts, caramel, nougat and other food products that typically form the inside of pet foods, and/or chocolate-covered candy bars. It should be understood however, that the final food product need not be subsequently covered in chocolate or any other food substance. In other examples, the edges are adapted for cutting through a food product that has already been covered with another food substance such as chocolate. In some embodiments, the cutting tool side walls are tapered to improve release of the product from the cutting tool.

In some examples, the edges may be beveled, meaning that the contacting face of the edges may not be perpendicular to the side walls of the cutting tool. This beveled shape of the cutting tool edge may also be referred to as the "grind" of the edge. The grind of an edge may refer to the cross-sectional shape of the edge, and a beveled edge may have a cross-sectional shape where the contacting face of the edge may not be perpendicular to the side walls of the cutting tool. For example, the contacting face of the edge may form a 45 degree angle relative to the line that extends outward from the side walls. Many other angles are possible. In some examples, the edges may have a double (or triple, etc.) bevel, meaning that the edge may include two (or more) contacting surfaces that are angled differently from each other. For example, an edge may have a first bevel of approximately 15 degrees and a second bevel of approximately 20 degrees. The beveled edges of a cutting tool may adapt the cutting tool to cut through food products and/or recede from the food products more easily.

Figure 6:
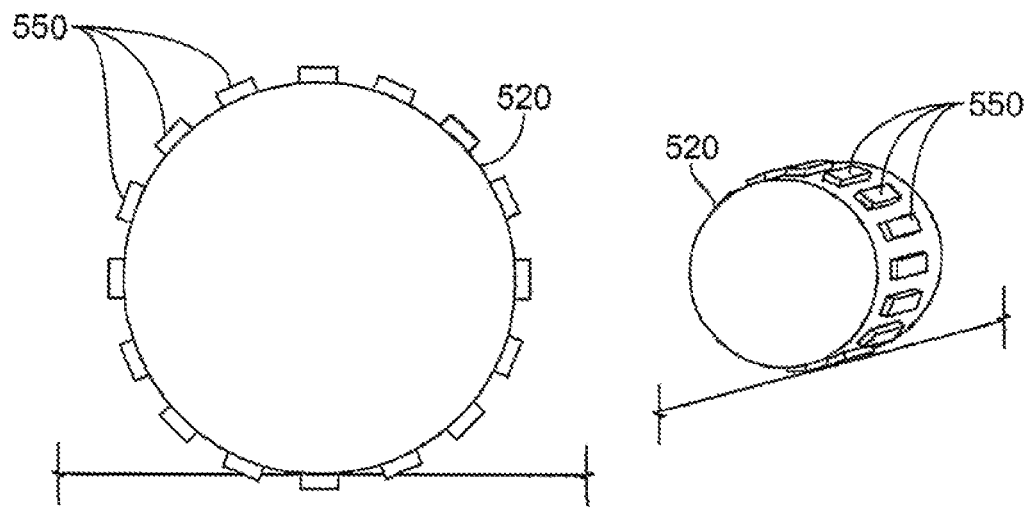
FIG. 6 is an illustration of an example ultrasonic rotary wheel, according to one or more embodiments of the present disclosure.

In some embodiments of the present disclosure, multiple cutting tools are disposed around the outer surface of the rotary wheel. FIG. 6 shows an illustration of an example rotary wheel 520 according to some embodiments of the present disclosure. In these embodiments, the rotary wheel 520 may resemble a rolling pin with cookie cutters (tools 550) attached to the outer curved surface of the rolling pin. It should be understood that the tools may either be attached to the outer curved surface such that they protrude outward beyond the curved surface of the rotary wheel, or they may be recessed into the rotary wheel such that each tool extends minimally from the curved surface of the rotary wheel, or not at all. In operation, as the rotary wheel rotates about its axis, cutting tools disposed at various locations around the rotary wheel take turns approaching the cutting surface of the conveying element, making contact with the food product and the cutting surface, and then receding from the cutting surface, leaving behind the cut and formed food product on the cutting surface.

In some embodiments, the tools disposed around the rotary wheel, in addition to cutting the food product, may also mold the food product into a more desirable three dimensional shape. In some embodiments, the shapes can be curvilinear and thus create a shape with a plurality of rounded surfaces. Each cutting tool may further include walls that are adjacent to the cutting edge and, potentially, a contoured cavity that may be adapted to mold the food product. It should be understood that manufacturers of food products are sometimes less concerned about the highly presentable appearance of the food product, and more concerned about economy, speed and volume. This may be especially true if the food product will be subsequently covered in chocolate, for example, after the food product is cut and formed by the rotary wheel. Therefore, different requirements of the manufacturer and different subsequent processes may result in the use of rotary wheels employing different tools. If, for example, the tools are used to only cut relatively flat strips of food product, it may not be necessary for the tools to have a contoured or cupped cavity for three dimensional molding of the food product. However, if the tools are used to cut and mold a thicker food product or a food product that requires a three dimensionally shaped or curvilinear top, the tools may have a contoured or cupped cavity for molding the food product. In one example, each tool includes one or more cutting edges, one or more walls that are adjacent to the cutting edges, and a contoured cavity. In this example, the cutting edge(s) will first contact the food strip; then the walls will contact the food strip, partially molding the food product; finally, the contoured cavity will contact the food strip, further molding or stamping the food product.

The rotary wheel typically has a cylindrical shape and is typically oriented such that the axis of the cylinder runs horizontally and the outer curved surface of the cylinder may continually make contact with (or come close to) a separate horizontal surface such as a conveyor belt. The ultrasonic rotary molding system may utilize cylinders with a variety of dimensions. For example, the circular cross-section of the cylinder may vary in radius, and the length of the axis of the cylinder may vary. Additionally, the ratio between the radius and the length of the axis may vary.

In some embodiments of the current disclosure, a rotary wheel may include ventilation channels. As shown in FIG. 3, the rotary wheel 221 on the left has holes or ventilation channels 222 that are bored or drilled substantially horizontally into the rotary wheel. Additionally, ventilation channels 224 are bored or drilled from the base of the tool 251's cavities and run toward the center of the rotary wheel 221 where they eventually intersect with the ventilation channels 222. As a result, a first ventilation channel 222 and a second ventilation channel 224 intersect to form a continuous ventilation channel 226 that runs from the inner base of a tool 251 such that air can flow to and from the base of the tool 251 from and to the exterior space surrounding the wheel. Each ventilation channel 226 vents the cavity so that air can enter and escape the tool 251's cavity while food products are being formed. Ventilation ensures that no vacuum builds up within the cavity which may make food product pieces stick and not release easily. In testing, some embodiments of the present disclosure have exhibited significant performance increases when the ventilation channels are used.

In some embodiments, the ventilation channels can the take the form of areas of discontinuity in the cutting edge of the cutting tools. In these embodiments, the areas of discontinuity can occur wherever the cutting tool runs parallel to the edge of the product strip. In some embodiments, the areas of discontinuity can be a single opening in the edge of the cutting tool while in other embodiments, there can be an area of discontinuity at every point where the cutting tool is parallel to the product strip. By placing the area(s) of discontinuity at point(s) where the cutting edge of the cutting tool runs parallel to the product strip, the shape of the formed product is not comprised.

In some embodiments, the size of the area(s) of discontinuity is at least 1.5 mm while in other embodiments the size can be less than 50 mm. In embodiments where the size of the area(s) of discontinuity is smaller, the taper of the cutting tool side wall may be decreased to improve release of the product from the cutting tool.

In yet another example embodiment, the ventilation channels may be coupled to an air or gas source that creates an air or gas pulse to positively pressurize the cavity to facilitate the ejection of food product pieces from the cavity. The ventilation channels 226 may be routed and adapted to allow a gas, for example a pressurized gas, to flow between the gas source and the base and/or cavity of the cutting tools 251, to aid in ejection of the food product. In some embodiments, the air or gas source may be in communication with one or more sensors, for example, optical sensors such as cameras. The sensors may be oriented and adapted to detect whether a food product has been properly ejected from the cavity of the cutting tools. The sensor may communicate a signal to the air or gas source when the sensor detects that a food product has not been properly ejected from a cavity, and, in response to the signal from the sensor, the air or gas source may generate a blast or pulse of air or gas through one or more of the ventilation channels, to aid in ejecting the food product. The sensors may aid a food manufacturer in lowering production costs because the air or gas source may only need to expend energy to blast air when a food product does not eject on its own. In some embodiments, the sensors may not communicate with an air source but may provide some other type of feedback and, for example, may stop the system or perform some other action in response to detecting that a food product has not been properly ejected.

The rotary wheel is typically attached to an ultrasonic generator (also referred to as an ultrasonic frequency generator) that introduces ultrasonic vibrations to one or more parts of the rotary wheel during operation of the system. In some embodiments, the ultrasonic generator and the rotary wheel are configured in such a manner that only a portion of rotary wheel vibrates, for example the tools that are attached to the rotary wheel, such that vibration does not translate to other parts of the apparatus. In other embodiments, the entire rotary wheel may vibrate. It should be understood that throughout this disclosure, whenever reference is made to the vibration of the rotary wheel, it is contemplated that either a part of the rotary wheel may vibrate, or the entire wheel may vibrate.

The rotary wheel may vibrate continuously at the same frequency and amplitude at all times during operation. For example, many rolling devices may operate at one constant frequency and amplitude because the machine is constantly feeding food product, the rollers are constantly rolling, and the tools are cutting at an even rate. In other embodiments, however, the rotary wheel may vibrate at different frequencies and different amplitudes during operation, depending on several factors.

The ultrasonic generator may operate (continuously or at a particular time) at a variety of frequencies and amplitudes. For example, the generator may vibrate (and causes the rotary wheel to vibrate) at an ultrasonic frequency of about 15,000 Hz to 30,000 Hz. In one specific example, the generator vibrates at an ultrasonic frequency of approximately 20,000 Hz. In other embodiments, the ultrasonic frequency may be less than 30,000 Hz, or less than 25,000, or less than 20,000 while in still other embodiments, the ultrasonic frequency may be more than 15,000 Hz or more than 20,000 or more than 25,000 Hz. In some embodiments, the ultrasonic frequency may be between 20,000 and 25,000 Hz. Adjusting the frequency of the vibrations may allow a technician to adapt the system for ideal operation. For example, frequencies that are too low may cause the system operate too loudly because the vibrations resonate in an audible range. On the other hand, frequencies that are too high may cause the rotary wheel and the cutting tools to vibrate so intensely that the cutting tools become unable to cut with ideal precision, and thus non-ideal tool shapes would have to be used.

As far as the amplitude of the ultrasonic generator, in some examples, the generator may vibrate with amplitudes of between about 20 and 50 microns. In one specific example, the generator vibrates with an amplitude of between about 30 and 40 microns. In some embodiments, the generator may vibrate with amplitudes of more than 20, or more than 25, or more than 30, or more than 35, or more than 40, or more than 45 microns while in still other embodiments, the generator may vibrate with amplitudes of less than 50, or less than 45, or less than 40, or less than 35, or less than 30 or less than 25 microns. In some embodiments the generator may vibrate with amplitudes of between about 25 and 45 microns, Adjusting the amplitude of the vibrations may allow a technician to adapt the system for ideal operation. For example, if the generator vibrates with amplitudes that are too low, the food product may, to some extent, stick to the cutting tools or blades. On the other hand, if the generator vibrates with amplitudes that are too high, the cutting tools and blades may get too hot which may result in the food product melting to some extent.

The ultrasonic generator may be comprised of an input converter and a transducer. The input converter converts an electrical input (for example, 60 HzAC, 117 VAC, or 240 VAC) to electrical pulses. The transducer then converts the electrical pulses received from the input converter to mechanical vibrations which are then introduced to the rotary wheel. In one embodiment of the present disclosure, the input converter converts an electrical input to about 20,000 electrical pulses, which the transducer then converts to about 20,000 mechanical vibrations per second. Various other types of equipment can be used in connection with (or as part of) the ultrasonic generator, such as, for example, a booster or reducer that can effectively increase or decrease the vibratory movement of the cutting tools, as desired.

The rotary wheel and associated cutting tools benefit from the ultrasonic vibrations in several ways. For example, the ultrasonic vibrations cause a reduction in the friction at the surfaces of the cutting tools, such as the cutting edges, the walls adjacent to the cutting edges and the contoured cavities (optional) of the tools. Surfaces with reduced friction are less prone to sticking to food product. Additionally, because the tools of the rotary wheel can cut without sticking to the food product, the apparatus may operate for longer periods of time before it needs to be stopped so that the cutting tools may be cleaned or replaced.

The surfaces of the cutting tools, such as the cutting edges, the walls adjacent to the cutting edges and the contoured cavities may be formed out of a variety of materials. Ultrasonic vibrations have been shown to reduce the friction properties of metal surfaces, as well as plastic surfaces, and thus, metal or plastic surfaces may be used, for example. It may be possible to further improve the friction properties of the surfaces of the tools by adding or coating one or more of the surfaces with a lubricious polymeric material. For example, the surfaces may be coated with a lubricious polymeric material such as polytetrafluoroethylene (sold commercially under the trademark TEFLON), which can be bonded to the surfaces of the cavities. Alternatively, the surfaces can be fabricated from a polymeric material that provides lubricious properties.

Another benefit of the ultrasonic vibrations is that the edges of the cutting tools cut more cleaning through the food product. For example, an ultrasonically vibrated cutting edge can make very clean cuts through peanuts, such that the peanuts are left with smooth edges. By contrast, when peanuts are cut with a regular knife or edge, the resulting peanuts may have jagged or crumbled edges.

Additionally, ultrasonic vibrations may help mix the food product, or maintain the food product in a well-mixed state. Ultrasonic vibrations have been used in processing of liquids and semi-liquids, by generating alternating low-pressure and high-pressure waves in liquids, leading to the formation and violent collapse of small vacuum bubbles. This phenomenon (sometimes termed "cavitation") causes high speed impinging liquid jets and strong hydrodynamic shear-forces that can be used for the disintegration of cells and mixing. It should be understood that some food products maintain a fairly constant consistency and, therefore, do not require mixing during the cutting and forming of the food strips. However, the mixing benefits of ultrasonic vibrations may be useful to maintain the consistence or further mix some types of food products.

Figure 7:
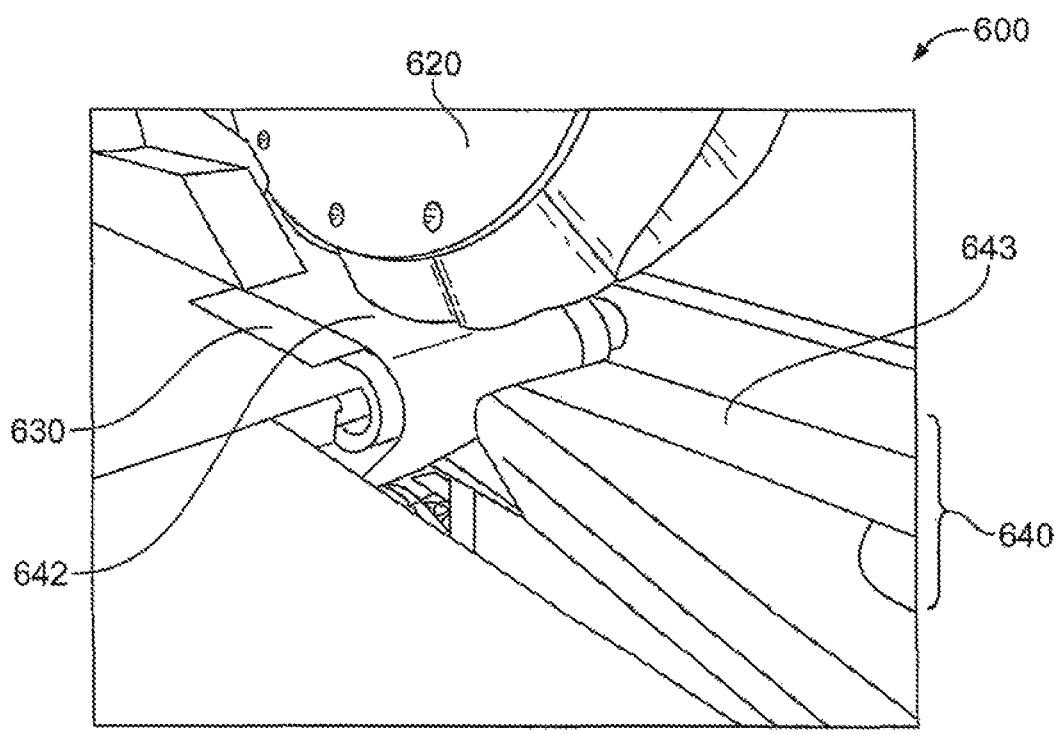
FIG. 7 is a close-up illustration of an example system for forming edible compositions, according to one or more embodiments of the present disclosure.

The ultrasonic rotary wheel system further includes a movable backing plate. As shown in the example in FIG. 1, the backing plate 130 may be disposed under a conveyor belt at the point where the tools of the rotary wheel 120 contact the strips of food product. This point of contact can be the point where the confectionery strips pass beneath the approximate center of mass 121 of the rotary wheel. The center of mass 121 of the rotary wheel 120 is typically located at the horizontal point of the axil of the rotary wheel, but this need not be the case. The backing plate 130 may be spring loaded such that a spring 132 causes the backing plate to exert force upward against the conveyor belt, and in turn against the food product that is moving on the conveyor belt. FIG. 7 shows another view of an example backing plate 630.

In this example, it can be seen that the backing plate 630 is located beneath a conveyor belt 642 and directly below a rotary wheel 620.

Figure 2:
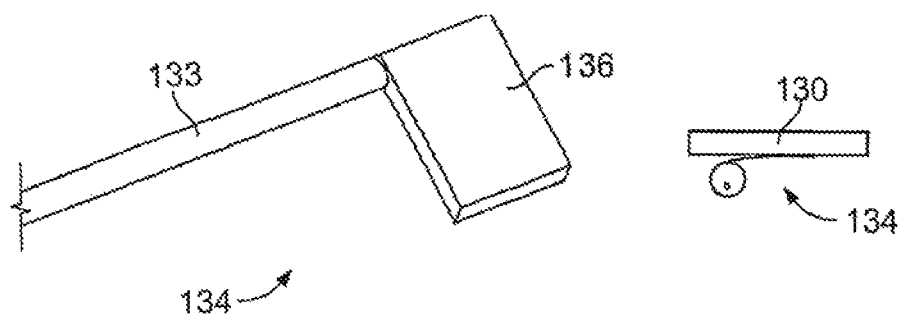
FIG. 2 is an illustration of an example spring that may be included as part of a system for forming edible compositions, according to one or more embodiments of the present disclosure.

Referring back to FIG. 1, the spring 132 may be implemented by a variety of designs. In some embodiments, as shown in FIG. 1, the spring 132 may be designed like a traditional coiled spring where as more force is exerted down on the spring 132, the spring compresses in a vertical direction and exerts more force upward against the backing plate 130 the more it compresses. In other embodiments, as shown in FIG. 2, the spring 134 may be designed to include a flexible fin 136 or paddle attached to a rod 133 where as more force is exerted down on the top surface of the fin 136, especially near the outer end of the fin, the fin wraps slightly more around the rod 133 and exerts more force in the opposite rotation direction, generally upward against the backing plate 130. The spring action of the fin-style spring 134 operates similar to the spring action of a diving board. FIG. 3 shows an example of how the rod 233 associated with the fin-type spring may be incorporated into a system 200. As shown in this example, the rod 233 may run through one or more solid pieces of the system 200 or solid pieces of nearby machinery such that the rod 233 is coupled to a solid base so that it can resist rotation as the fin (not shown) torques the rod 233. The rod 233 then connects with a fin (not shown) that is located beneath the backing plate 230. In another example, the fin may be adhered to the backing plate 230 or the fin may be formed with the backing plate 230 so that they constitute a single molded piece.

The spring (for example spring 132 and/or spring 134) may be adapted to have an adjustable spring tension so that the spring and the backing plate may exert a range of forces, depending on the desired application. For example, the spring tension system may be adjusted so that the spring exerts a pressure that may range from zero pounds to approximately 50 pounds of force. In some embodiments, the spring pressure may be more than 10, more than 20, more than 30, or more than 40 pounds of force while in other embodiments, the spring pressure may be less than 50, or less than 40 or less than 35, or less than 30 or less than 25 or less than 20 or less than 15 or less and 10 pounds of force. In another example, the spring operates within a range of forces between approximately 10 pounds and 20 pounds. In some embodiments, the spring may exert a pressure of from about 5 to about 45 pounds of force while in other embodiments, the pressure may be from about 15 to about 35 pounds of force. The spring tension may be adjusted in a variety of manners. For example, spring may simply be replaced with a different spring with different resistance properties. In another example, a coiled spring may include a dial that can increase the resistance of the spring. In yet another example, the resistance of a fin-styled spring may be increased by rotating the rod so that the fin rests in a more torqued initial position when no food product is on the backing plate.

Additionally, in some embodiments, the rotary wheel(s) may be adjustable vertically so that the distance and/or pressure between the rotary wheel and the conveyor belt (and the backing plate) may change as the rotary wheel is adjusted. For example, the rotary wheel may be adjusted by a screw gear.

One object of the movable backing plate is to compensate for the effect of ultrasonic vibrations on the conveyor belt (from the cutting element). In order for the rotary wheel tools to cut through the food product strips, pressure must be exerted downward on the food product, and thus, the cutting edges of the tools also exert pressure downward upon the belt. The movable backing plate is adapted to absorb some of the pressure that is exerted down on the belt from the cutting tools, which reduces the amount of damage caused by the cutting tools on the belt. Therefore, the movable backing plate allows for long term operation of the ultrasonic rotary wheel system with reduced cutting or wearing of the conveyor belt. Additionally, the movable backing plate evens out the pressure exerted on the belt which allows for more consistent cutting.

Another benefit of the movable backing plate may be that it minimizes or prevents completely any leaking of food product from the cutting tools of the rotary wheel. The movable backing plate in conjunction with a semi-flexible conveyor belt may allow for evenly-spaced contact between the edges of the cutting tool and the belt, thereby allowing the cutting tools to cut completely through the food product strips, making clean cuts with minimal or no leakage of food product from between the cutting edge of the tool and the conveyor belt.

The ultrasonic rotary wheel system further includes a conveying element, which may further include one or more flexible belts (i.e., conveyor belts). FIG. 3 shows an illustration of an example system 200 that includes a conveying element 240 that further includes two conveyor belts 242, 243, as well as components that facilitate movement of the belt (such as rollers, gears, gear belts, a motor and the like) and optional support platforms that may supply a sturdy surface below the conveyor belts if needed. For example, a sturdy surface may be required when a piece of machinery must apply force downward upon a food product that is moving on the conveyor belt. In other embodiments, the conveying element may include a series of rollers, a series of discrete conveyor belts, or other means of conveying a food product along a feed path. (The path that a food product travels, along the top of the conveying element, from its form as a strip, through the rotary wheel, and beyond, is sometimes referred to as the "feed path.")

It should be understood that even though FIG. 1 shows the conveying element 140 as including a single conveyor belt, the conveying element may include more than one conveyor belt. For example, a dual conveyor belt embodiment of a system is shown in FIG. 3, and more closely in FIG. 7. In these embodiments, the conveying element includes two conveyor belts, each conveyor belt being independently powered, for example, with independent rollers, gears, gear belts, motors and/or the like. In these embodiments, in operation, the food product travels from left to right (as the figures are depicted). The food product first travels along the left conveyor belt (242 in FIGS. 3 and 642 in FIG. 7) and then gets formed by a rotary wheel (220 in FIGS. 3 and 620 in FIG. 7). In these examples, the spring-loaded backing plate (230 in FIGS. 3 and 630 in FIG. 7) is located near the end (or nose) of the left conveyor belt. Then the food product transfers to the next conveyor belt (243 in FIGS. 3 and 643 in FIG. 7), the one of the right.

One benefit of a dual conveyor belt embodiment can be seen in FIG. 9, which depicts another example system 900. Again, as shown in FIG. 9, in operation, the food products travel from left to right (as the figure is depicted). As the food product transfers from the conveyor belt 942 on the left to the conveyor belt 943 on the right, the "webbing" (or the excess food product), that is created when the rotary wheel tools (of rotary wheels 920) stamp the food product strips, falls between the two conveyor belts, where it is then carried away. In an exemplary embodiment, the ultrasonic rotary wheel tools cut through the strips of food product so cleanly, that the webbing easily falls away when it is no longer supported from below. Quick removal of the webbing may help to ensuring that scrap food product does not re-adhere to the formed food product after it is formed and cut by the rotary wheel. Additionally, in some embodiments, the second belt (the belt on the right, or the take-away belt) may be run at a higher speed than the first belt (the belt on the left, or the forming belt). This difference in speed of the successive belts may create a gap between successive formed food pieces so that they do not stick to each other after they are formed.

The ultrasonic rotary molding system may utilize a single lane of conveyor belts, or it may utilize multiple lanes of individual conveyor belts. The difference in these two embodiments can be seen, for example, if FIG. 3 and FIG. 9 are compared. In FIG. 3, multiple separate lanes are used, one lane per rotary wheel. By contrast, in FIG. 9, a single conveyor belt lane is used, even though the system includes multiple rotary wheels 920. Utilizing multiple strips of food product and/or multiple separate conveyor belts may provide benefits while forming food products. For example, separate strips of food product allows for the system to employ multiple staggered wheels, and multiple separate conveyor belts with widths that are narrower than the widest width of the cutting tools may facilitate the webbing or scrap food product to fall away from the formed food product quickly, sometimes immediately after forming. Quick removal of the webbing or trim may help to ensuring that scrap food product does not re-adhere to the formed food product after it is formed and cut by the rotary wheel.

In some embodiments, the conveying element may include one or more side-rail guides. For example, each lane of conveyor belts may include a side rail guide on either or each side of the lane. For each lane, the side rail guides may extend the entire length of the conveying element or a portion of the length of the conveying element. For example, the side rail guides may extend along portions of the conveying element that lead into and out from the rotary wheel. The side rail guides may be positioned and adapted aid a food product traveling on a conveyor belt from straying. For example, side rail guides that extend along portions of the conveying element that lead into the rotary wheel may aid strips of food product from straying and/or falling off of the conveyor belt. As another example, side rail guides that extend along portions of the conveying element that lead out from the rotary wheel may aid molded pieces of food product from straying and/or falling off of the conveyor belt.

The conveyor belt's outer surface may have a variety of textures (or lack thereof). In one embodiment, the outer surface is a very smooth surface. A smooth outer surface may be beneficial because it may allow for superior adhesion between the outer belt surface and the food product because a smooth surface allows for more surface area contact between the belt and the food product. Better adhesion facilitates the belt to pull the food product from the cutting tools after they have completed cutting and forming the food product. Additionally, better adhesion prevents the food product from slipping and moving backwards along the conveyor belt as the food product is fed into the rotary wheel as well as other stages in the system that may require that a machine part touch the food product. In a specific example of this embodiment, the conveyor belt may include an FDA-approved smooth surface that is safe to contact the food products and a belt that is partially or wholly constructed of fabric and is adapted to withstand bending and turning around sharp corners, curves and the like. Other embodiments of the present disclosure may include conveyor belts with outer types of surfaces that are not perfectly smooth and/or are textured because some types of food products may stick better to textured surfaces.

Figure 10:
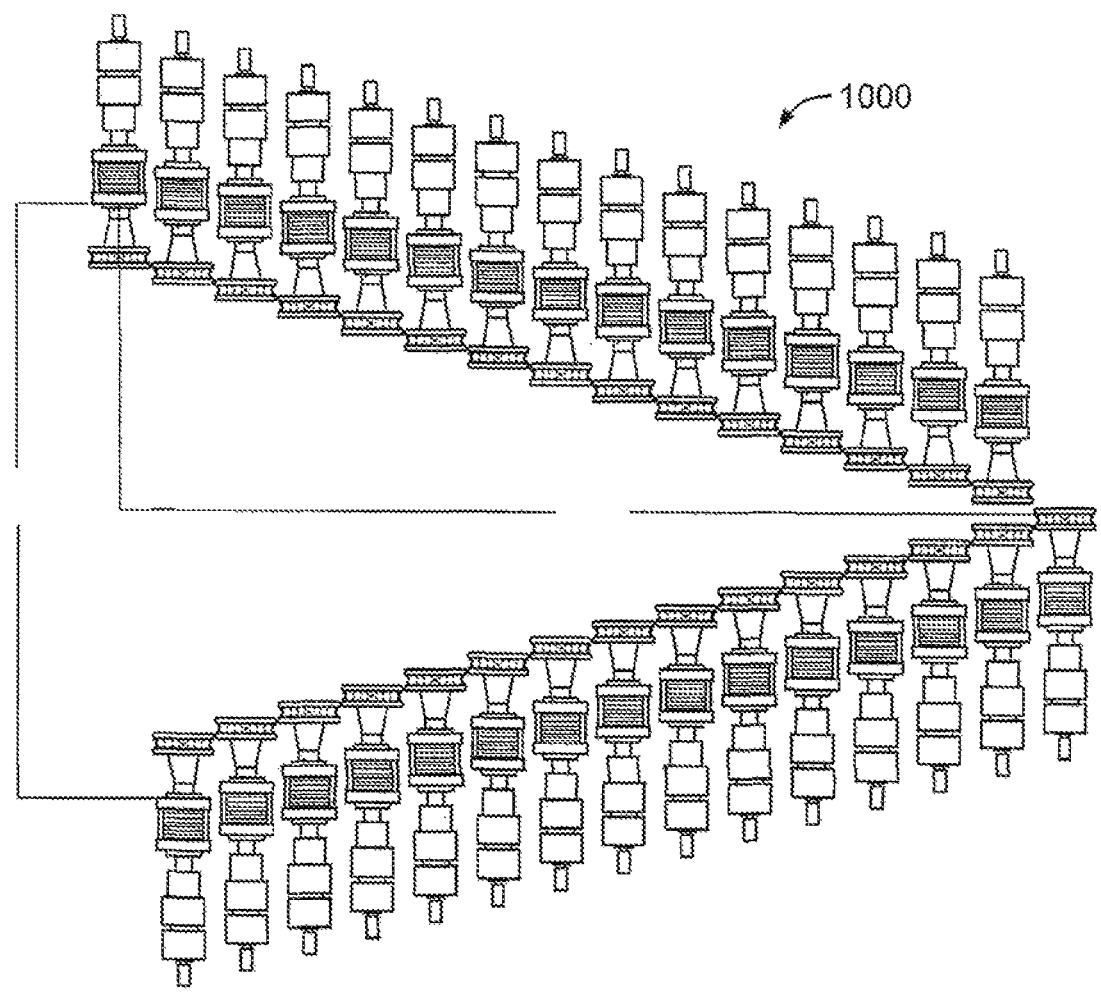
FIG. 10 is a top-plan-view illustration of an example system for forming edible compositions, including thirty rotary wheels, according to one or more embodiments of the present disclosure.

As mentioned above, the ultrasonic rotary molding system may include more than one rotary wheel. In some embodiments, the rotary wheels are staggered, as is shown in FIG. 8 (the figure on the top), which shows a top view of an example system. FIGS. 3, 9, and 10 also show illustrations of embodiments with staggered rotary wheels. As can be seen from these figures, the system may be configured to accommodate a wide range of numbers and orientations of rotary wheels, from a single wheel, to four wheels (FIG. 9), to 30 wheels as shown in the example of FIG. 10. More specifically, FIG. 10 shows an example of how a system 1000 may be scaled up to include many rotary wheels while keeping the footprint of the overall system manageable. For example, a 'V' configuration, as shown in FIG. 10, is one example of a system with a manageable footprint.

In some embodiments, multiple rotary wheels contact multiple edible food product masses. In such embodiments, the edible food product mass may be formed into strips prior to contacting the rotary wheels such that multiple strips contact the multiple wheels. In other embodiments, multiple rotary wheels contact a single edible food product mass. In such embodiments, the edible food product mass may be formed into a sheet prior to contacting the rotary wheels such that a single sheet contacts the multiple wheels.

Even though FIG. 8 and other figures throughout this disclosure may show the system as including staggered rotary wheels, it should be understood that the rotary wheels may be oriented such that at least one rotary wheel in the system is oriented in-line with another rotary wheel, such that the axis of at least one rotary wheel approximately aligns with the axis of another rotary wheel in the system. See FIG. 8 (the figure on the bottom) for an example of a fully in-line system 800.

In some embodiments of the present disclosure, the system may further include one or more lift prevention mechanisms. A lift prevention mechanism may be located downstream from each rotary wheel, for example, near the point where molded pieces of food product exit the cutting tools of the rotary wheel. In some examples, after a molded piece of food product exits a cutting tool and falls down upon the conveyor belt, the molded piece may tend to lift up off of the conveyor belt, for example, because an edge of the cutting tool catches or sticks to a portion of the molded piece. A lift prevention mechanism may be positioned and adapted to prevent molded pieces from lifting and/or may apply pressure down on the molded pieces to ensure they remain adhered to the conveyor belt. The lift prevention mechanism may include a finger or bar that applies pressure to the molded pieces, and may include a spring or motor mechanism to engage the finger or bar.

Figure 11:
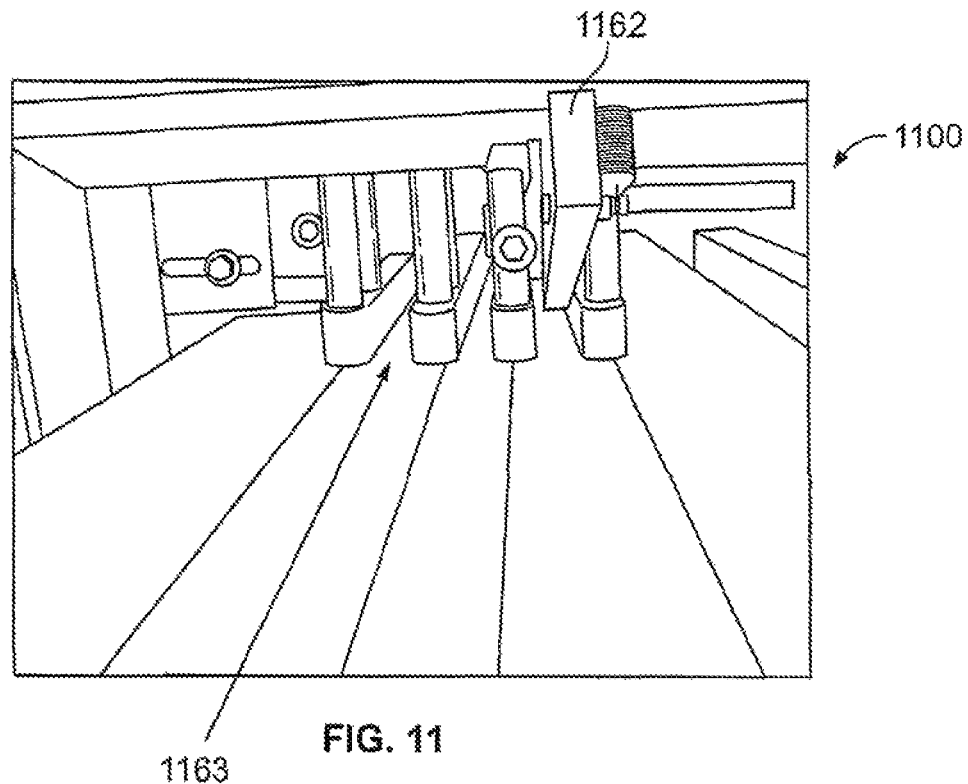
FIG. 11 is an illustration of an example infeed stage, according to one or more embodiments of the present disclosure.

In some embodiments of the present disclosure, the system may further include an infeed stage 1100, as shown in FIG. 11. In these embodiments, the infeed stage 1100 may further include one or more pressure fingers 1162, 1163, where each pressure finger applies a downward force to the food products that are moving along the conveyor belt toward the rotary wheel, for example, to ensure that the food products are well adhered to the conveyor belt before they reach the rotary wheel. In some embodiments, a single lane of the infeed stage may include more than one pressure finger, for example, two or more pressure fingers in series. In these embodiments, multiple pressure fingers may engage a single strip of food product, for example to ensure that the food product is well adhered to the conveyor belt. The infeed stage 1100 is typically located upstream (in the feed path) from the rotary wheel(s), for example, at distance upstream such that the tip of a pressure finger is approximately 1 to 2 inches away from the point where the rotary wheel contacts the food product. The pressure finger 1162 may be spring loaded whereby the spring forces the tip of the finger in a downward direction. Different springs may be used so that the pressure finger may exert different downward forces, for example, between 10 and 15 pounds. The spring may attach to the pressure finger at varying locations along the finger. The pressure finger 1162 may be formed from a variety of materials, for example, plastic.

The infeed stage may include one or more side rail guides. For example, side rail guides that extend along portions of the conveying element that lead into the rotary wheel may aid strips of food product from straying and/or falling off of the conveyor belt. Side rail guides may keep the food product approximately centered on a conveyor belt while the food product is contacted by one or more pressure fingers and/or a rotary wheel.

In some embodiments of the system that do not include an infeed stage 1100 and a pressure finger 1162, the food product may not sufficiently adhered to the conveyor belt, and therefore, the food product may slip or slide backwards along the conveyor belt when the rotary wheel touches the food product. If food products slip backwards, the food products may back up, and the system may have to be shut down and cleaned out. In order to address this problem, the hold down finger 1162 may exert pressure down on the food product to better adhere it to the conveyor belt so that the food products do not slip. One benefit of a system where the food products do not slip is that the system may be adapted for continuous and efficient operation.

In some embodiments of the present disclosure, the system further comprises a sheet forming device that is located upstream (in the feed path) from the rotary wheel. The sheet forming device forms an edible composition mass into a product sheet upstream.

In some embodiments of the present disclosure, the system further comprises a slitting device that is located upstream (in the feed path) from the rotary wheel. The slitting device divides product sheets into a plurality of product strips prior to the strips being fed to the ultrasonically activated rotary wheel.

Another embodiment of the present disclosure provides a method for forming a confectionery product (or a food product) comprising the following steps: (1) forming one or more confectionery product strips; (2) moving the confectionery product strips along a feed path that may include a conveyor belt; and (3) cutting the confectionery product strips into a plurality of confectionery product shapes by contacting the confectionery strips with an ultrasonically activated rotary wheel.

Regarding step 1 of the described method, forming the confectionery product strip may further include the steps of forming a confectionery sheet and slitting the sheet into strips. Regarding step 2, the step may also include a sub step where the product strips move through an infeed stage, whereby a pressure finger applies downward pressure to the product strips to adhere them to the conveyor belt. Regarding step 3, the rotary wheel may include a plurality of cutting tools that contact the confectionary strips at a point where the confectionery strips pass beneath the approximate center of mass of the rotary wheel. At the point where the rotary wheel contacts the confectionary strip, a moveable backing plate that is positioned beneath a conveyor belt may allow for absorption of some of the pressure that the rotary wheel exerts down on the confectionary strip and the conveyor belt.

The previously described method(s) may be executed by one or more of the systems, apparatuses and/or solutions described in this disclosure. For example, the method may be executed by a system that comprises an ultrasonically activated rotary wheel, a moveable backing plate and a conveying element. In another example, the system that executes the method(s) may include a moveable backing plate that is spring loaded.

The solutions described in present disclosure may provide several benefits. Previous styles of ultrasonic food cutters have disadvantages, and the solutions of the present disclosure either do not experience these disadvantages or they experience them to a lesser degree. For example, guillotine-style cutters can utilize only generally straight blades, so the guillotine cutter can only cut food products into final shapes that have linear and angular edges. One benefit of some embodiments described herein is that the tools that are attached to the rotary wheel are not limited to having only straight and angular edges, and therefore, the rotary wheel may produce final food products that have a variety of shapes including circles, ovals, egg-shapes, animal shapes and more. Moreover, because the tool that cuts the strips of food product may also contain a three dimensionally formed cavity, some embodiments described herein may cut and three dimensionally shape a final food product all in one step. This three dimensional shaping was not possible with previous styles of guillotine cutters.

The previous double-wheel style of food cutter has disadvantages as well. Those experienced in the industry have observed that this style of food cutter is expensive as well as equipment and parts intensive. Essentially, the double-wheel style requires two of every part because two wheels are required for every strip of food product that runs along the conveyor belt. This means each strip of food product requires two wheels, two spindles, two sets of hardware, two sets of add-on tools, and so on. Consequently, if food product manufacturers want to operate conveyor belts with between 30 and 50 strips of food running in parallel, the double-wheel style of food cutter would require two times the amount of equipment for each strip of food compared to the single wheel of the present disclosure. Consequently, the double-wheel style is less durable and breaks down more often than the single wheel style of the present disclosure. Additionally, the extra equipment and the higher maintenance costs of the double-wheel style make the double-wheel style more expensive to run than the single wheel style.

Additionally, the double-wheel style is not conducive to "scaling up." That is, the double-wheel style cannot handle large volumes of food product as well as the solutions of the current disclosure. In addition to the additional equipment and cost of handling larger volumes of food product, the double-wheel machines cannot run at the fast speeds that the single wheel of the present disclosure can. For example, with the double-wheel machines, the conveyor belts run at a maximum speed of approximately 1.5 meters l minute. This is much slower than the solutions of the present disclosure where the conveyor belts may run at approximately 4 meters/minute.

One additional benefit of the system as described in one or more embodiments of the present disclosure is that the single rotary wheel design allows for compositional consistency between different "forms" of the same type of food product. For example, the system may provide compositional consistency between the confection known as a Snickers® bar and the confection known as a Snickers® egg, such that the bar and the egg taste exactly the same even though they are differently shaped and sized. The reason that the composition of the different forms remains consistent is because the ratios of different types of food products across different "regions" of the final food product are maintained at the same level in, for example, the bar and the egg. Previous styles of double rotary wheel systems may be unable to maintain such consistency because, for example, the food product may be poured into cavities specifically designed for each form of the final food product. By contrast, the in the present system, the food product is pre-formed regardless of the final form of the food product, and then different tools on the rotary wheel cut the final shape.

In one embodiment, after the once the product shapes are formed by cutting, a coating layer may be applied to one or more of the product shapes. Additionally, or alternatively, one or more of the product shapes may be subjected to a surface treatment. In one embodiment these one or both steps may be downstream from the rotary wheel. For example, after forming the edible product forms may be enrobed, coated by tumbling as in the case of a panning operation or otherwise surface treated by spraying.

FIGS. 12-28 illustrate various embodiments of cookie cutters or tools similar to the cookie cutter/tool 450 shown in FIG. 5 or tool 550 as shown in FIG. 6.

Figure 12:
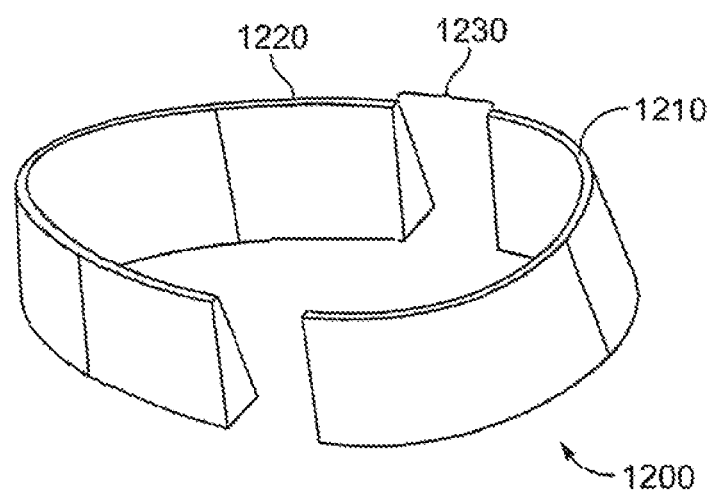
FIG. 12 illustrates a perspective view of an egg-shaped tool having a first portion, a second portion, and a vented region.
Figure 26:
FIGS. 25-28 illustrate various views of an alternative egg-shaped tool.
Figure 28:
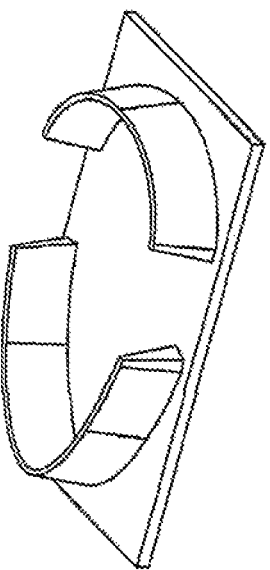

More specifically, FIG. 12 illustrates a perspective view of an egg-shaped tool 1200 having a first portion 1210, a second portion 1220, and a vented region 1230.

FIGS. 13-16 illustrate various views of a heart-shaped tool also having a first portion, a second portion, and a vented region.

FIGS. 17-20 illustrate various views of a Christmas-tree-shaped tool having several portions and several vented regions.

FIGS. 21-24 illustrate various views of a pumpkin shaped tool having several portions and several vented regions.

Figure 25:
Figure 27:
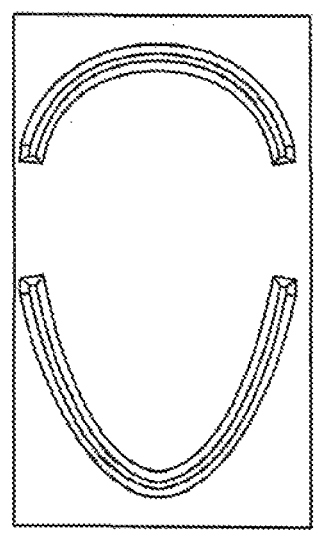

FIGS. 25-18 illustrate various views of an alternative egg-shaped tool.

While the present solutions have been described and illustrated by reference to particular embodiments, it will be appreciated by those of ordinary skill in the art that the solutions lend themselves to many different variations not described or illustrated herein.

The invention claimed is:

1. A system for forming an edible food product comprising:
    an ultrasonically activated rotary wheel that includes one or more cutting tools disposed on the outer surface of the rotary wheel;
    a conveying element that moves a food product on a surface in relation to the rotary wheel; and
    a vertically movable backing plate disposed beneath the surface of the conveying element and beneath the approximate center of mass of the rotary wheel, the vertically movable backing plate being configured to move its position when the cutting tool exerts pressure downward upon the conveyer;
    whereby, as the rotary wheel rotates, the one or more cutting tools of the rotary wheel contact the food product and the conveying element at the approximate location of the movable backing plate
    further comprising a flexible fin, wherein the flexible fin is configured to exert a force upward against the vertically movable backing plate.

2. The system of claim 1, wherein the one or more cutting tools of the rotary wheel each include (i) a contoured surface for three dimensional molding of the food product and/or (ii) edges that are beveled.

3. The system of claim 1, wherein a portion of the conveying element includes one or more side-rail guides to prevent the food product from straying or falling off the conveying element.

4. The system of claim 1, wherein rotary wheel is coupled to an ultrasonic generator.

5. The system of claim 4, wherein the ultrasonic generator causes only a subset of the parts that compose the rotary wheel to vibrate at an ultrasonic frequency.

6. The system of claim 4, wherein the ultrasonic generator causes all of the parts that compose the rotary wheel to vibrate at an ultrasonic frequency.

7. The system of claim 1, wherein the rotary wheel includes one or more ventilation channels comprising at least one area of discontinuity in a cutting edge of the one or more cutting tools.

8. The system of claim 1, wherein the conveying element includes more than one conveyor belt, where each conveyor belt is independently powered.

9. The system of claim 1, wherein the conveying element includes one or more conveyor belts with (i) an outer surface that is smooth so that the food product adheres to the surface and/or (ii) widths that are narrower than the widest point of the one or more cutting tools.

10. The system of claim 1, wherein each of the one or more cutting tools is defined by a side wall and at least one beveled edge, wherein the bevel edge that is not perpendicular to the side walls of the cutting tool.

11. The system of claim 1, wherein the at least one bevel edge is about 15 to about 45 degrees relative to the side wall of the cutting tool.

12. The system of claim 1, wherein the rotary wheel includes one or more ventilation channels that are routed and adapted to allow a pressurized gas to flow between a gas source and the cutting tools to aid in ejection of the food product from the cutting tools, the gas source being in communication with one or more sensors adapted to detect whether the food product has been properly ejected from the cutting tool.

13. The system of claim 1, wherein the movable backing plate is configured to compensate for the effect of ultrasonic vibrations on the conveying element.

14. The system of claim 1, wherein the vertically movable backing plate is configured to reduce the amount of damage caused by the cutting tools on the belt by absorbing pressure exerted down on the conveying element from the cutting tools.

15. The system of claim 1, wherein the vertically movable backing plate is configured to exert force upwards against the conveying element over a range of forces.

16. A system for forming an edible food product comprising:
    a rotary wheel comprising a plurality of cutting tools disposed on an outer surface of the rotary wheel, each cutting tool has a side wall and at least one beveled edge, wherein the at least one bevel edge is a cutting edge that is not perpendicular to the side wall of the cutting tool;
    a conveyer comprising a surface, the conveyer configured to move a food product on its surface; and
    a vertically movable backing plate under the surface of the conveying element;

wherein each cutting tool has at least one edge having a first bevel and a second bevel, wherein the first and second bevels have different angles relative to the side wall of the cutting tool;

wherein the movable backing plate is configured to move its position when the cutting tool comes into contact with the conveyor belt and cutting edges of the tools exert pressure downward upon the conveyer;

wherein the system is configured to rotate the rotary wheel such that each of the plurality of cutting tools contacts the food product when the food product is positioned above the movable backing plate further comprising a flexible fin, wherein the flexible fin is configured to exert a force upward against the vertically movable backing plate.

17. The system of claim 16, wherein the system is configured to rotate the rotary wheel such that each cutting tool comes in contact with the conveyer.

\* \* \* \* \*